(12) United States Patent
Jain et al.

(10) Patent No.: US 10,885,338 B2
(45) Date of Patent: Jan. 5, 2021

(54) IDENTIFYING CABLE ENDS USING AUGMENTED REALITY

(71) Applicant: International Business Machines Corporation, Armonk, NY (US)

(72) Inventors: Rakesh Jain, San Jose, CA (US); Ramani Routray, San Jose, CA (US); Mu Qiao, Belmont, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/421,267

(22) Filed: May 23, 2019

(65) Prior Publication Data

US 2020/0372253 A1    Nov. 26, 2020

(51) Int. Cl.
  *G06K 9/00* (2006.01)
  *G06K 9/20* (2006.01)
  *G06T 11/60* (2006.01)

(52) U.S. Cl.
  CPC ....... *G06K 9/00671* (2013.01); *G06K 9/2063* (2013.01); *G06T 11/60* (2013.01)

(58) Field of Classification Search
  None
  See application file for complete search history.

(56) References Cited

U.S. PATENT DOCUMENTS

| | | | |
|---|---|---|---|
| 6,078,698 A | 6/2000 | Lorton et al. | |
| 7,274,380 B2 | 9/2007 | Navab et al. | |
| 8,860,760 B2 | 10/2014 | Chen et al. | |
| 9,361,729 B2 | 6/2016 | Narayanan | |
| 9,401,849 B2 | 7/2016 | Tanaka | |
| 9,465,129 B1 | 10/2016 | Olsson et al. | |

(Continued)

FOREIGN PATENT DOCUMENTS

| | | | |
|---|---|---|---|
| JP | 2009118638 | * 5/2009 | |
| JP | 2011-130652 | * 6/2011 | ............... H02G 1/00 |

(Continued)

OTHER PUBLICATIONS

Kasprzak, Feature-based Indoor Navigation using Augmented Reality, IEEE 9th International Conference on Intelligent Environments, Jul. 2013, DOI: 10.1109/IE.2013.51 (Year: 2013).*
Paladini, M., "3 Different Types of AR Explained: Marker-Based, Markerless & Location," blippAR, Aug. 14, 2018, 7 pages, retrieved from https://www.blippar.com/blog/2018/08/14/marker-based-markerless-or-location-based-ar-different-types-of-ar.

(Continued)

*Primary Examiner* — Phuc N Doan
(74) *Attorney, Agent, or Firm* — Zilka-Kotab, P.C.

(57) ABSTRACT

An apparatus includes a cable having two ends and at least two object markers coupled to the cable configured to enable augmented reality (AR) detection of each end of the cable among a plurality of cables. A computer-implemented method using augmented reality (AR) technology includes selecting a cable of interest, identifying an object marker at a first end of the cable of interest, and storing the object marker. The method also includes scanning a plurality of cables, detecting a second instance of the object marker, and identifying a second end of the cable of interest based on the object marker. A computer program product for detecting ends of cables using augmented reality (AR) technology, includes a computer readable storage medium having program instructions embodied therewith. The program instructions executable by a computer to cause the computer to perform the foregoing method.

17 Claims, 5 Drawing Sheets

(56) References Cited

U.S. PATENT DOCUMENTS

| | | | |
|---|---|---|---|
| 10,295,777 B1* | 5/2019 | Gutierrez Flores | H01B 7/18 |
| 2012/0075343 A1* | 3/2012 | Chen | G09G 5/397 |
| | | | 345/633 |
| 2012/0293550 A1 | 11/2012 | Lo et al. | |
| 2013/0127906 A1* | 5/2013 | Sugita | G06T 7/001 |
| | | | 345/633 |
| 2014/0247278 A1 | 9/2014 | Samara et al. | |
| 2015/0302650 A1 | 10/2015 | Abdelmoati et al. | |
| 2016/0078683 A1 | 3/2016 | Sudol et al. | |
| 2016/0342839 A1 | 11/2016 | Condel | |
| 2017/0046876 A1 | 2/2017 | Bean et al. | |
| 2017/0069120 A1 | 3/2017 | Benner et al. | |

FOREIGN PATENT DOCUMENTS

| | | | | |
|---|---|---|---|---|
| KR | 20200075693 | * | 6/2020 | G02B 6/02 |
| WO | WO2010112207 | * | 10/2010 | G02B 6/4482 |
| WO | 2016071896 A1 | | 5/2016 | |

OTHER PUBLICATIONS

Xerox, "DataGlyph iQ. Document Technology," Xerox, 2019, 5 pages, retrieved on May 23, 2019, from https://www.xerox.com/downloads/usa/en/d/Dataglyphtech.pdf.

Fuchs et al., "Highlighting Techniques for Real Entities in Augmented Reality," International Conference on Computer Graphics Theory and Applications, vol. 1, 2016, pp. 259-270.

Garach, N., "Fine Grained Location Using Mobile Augmented Reality," Thesis, San Diego State University, 2012, 62 pages.

Holt et al., "Immersive Virtual Reality in Cable and Pipe Routing: Design Metaphors and Cognitive Ergonomics," Journal of Computing and Information Science in Engineering, vol. 4, Sep. 2004, pp. 161-170.

Henderson et al., "Evaluating the Benefits of Augmented Reality for Task Localization in Maintenance of an Armored Personnel Carrier Turret," IEEE International Symposium on Mixed and Augmented Reality 2009 Science and Technology Proceedings, Oct. 2009, pp. 135-144.

Jain et al., U.S. Appl. No. 17/016,105, filed Sep. 9, 2020.

* cited by examiner

IDENTIFYING CABLE ENDS USING AUGMENTED REALITY

BACKGROUND

The present invention relates to augmented reality, and more specifically, this invention relates to using augmented reality to identify cable ends.

SUMMARY

An apparatus, according to one embodiment, includes a cable having two ends and at least two object markers coupled to the cable configured to enable augmented reality (AR) detection of each end of the cable among a plurality of cables.

A computer-implemented method using augmented reality (AR) technology, according to one embodiment, includes selecting a cable of interest, identifying an object marker at a first end of the cable of interest, and storing the object marker. The method also includes scanning a plurality of cables, detecting a second instance of the object marker, and identifying a second end of the cable of interest based on the object marker.

A computer program product for detecting ends of cables using augmented reality (AR) technology, according to one embodiment, includes a computer readable storage medium having program instructions embodied therewith. The program instructions executable are by a computer to cause the computer to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using augmented reality to identify cable ends.

In one general embodiment, an apparatus includes a cable having two ends and at least two object markers coupled to the cable configured to enable augmented reality (AR) detection of each end of the cable among a plurality of cables.

In another general embodiment, a computer-implemented method using augmented reality (AR) technology includes selecting a cable of interest, identifying an object marker at a first end of the cable of interest, and storing the object marker. The method also includes scanning a plurality of cables, detecting a second instance of the object marker, and identifying a second end of the cable of interest based on the object marker.

In another general embodiment, a computer program product for detecting ends of cables using augmented reality (AR) technology includes a computer readable storage medium having program instructions embodied therewith. The program instructions are executable by a computer to cause the computer to perform the foregoing method.

Figure 1:
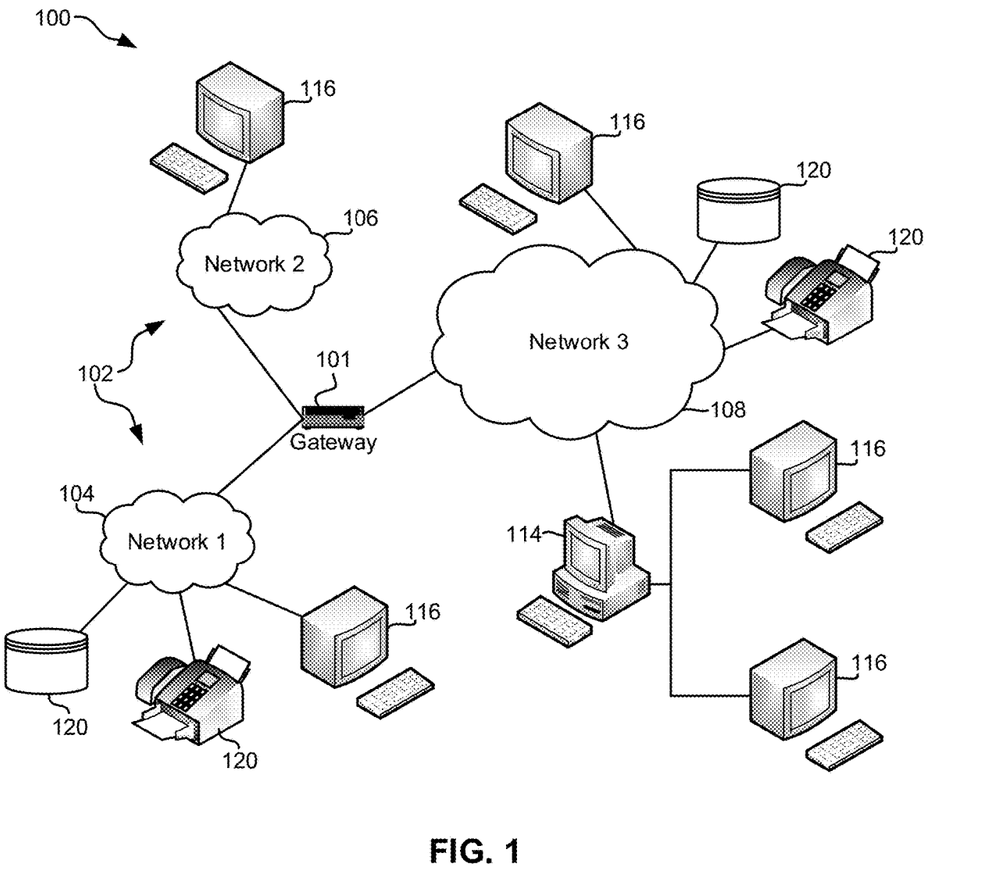
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
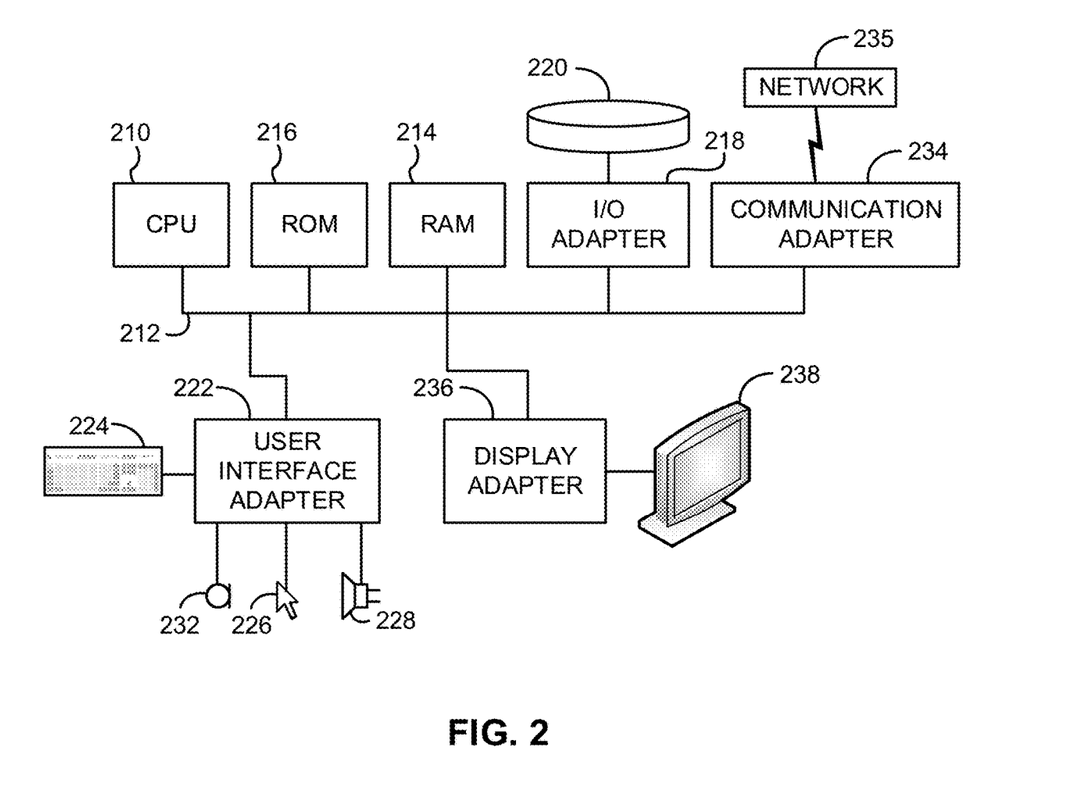
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
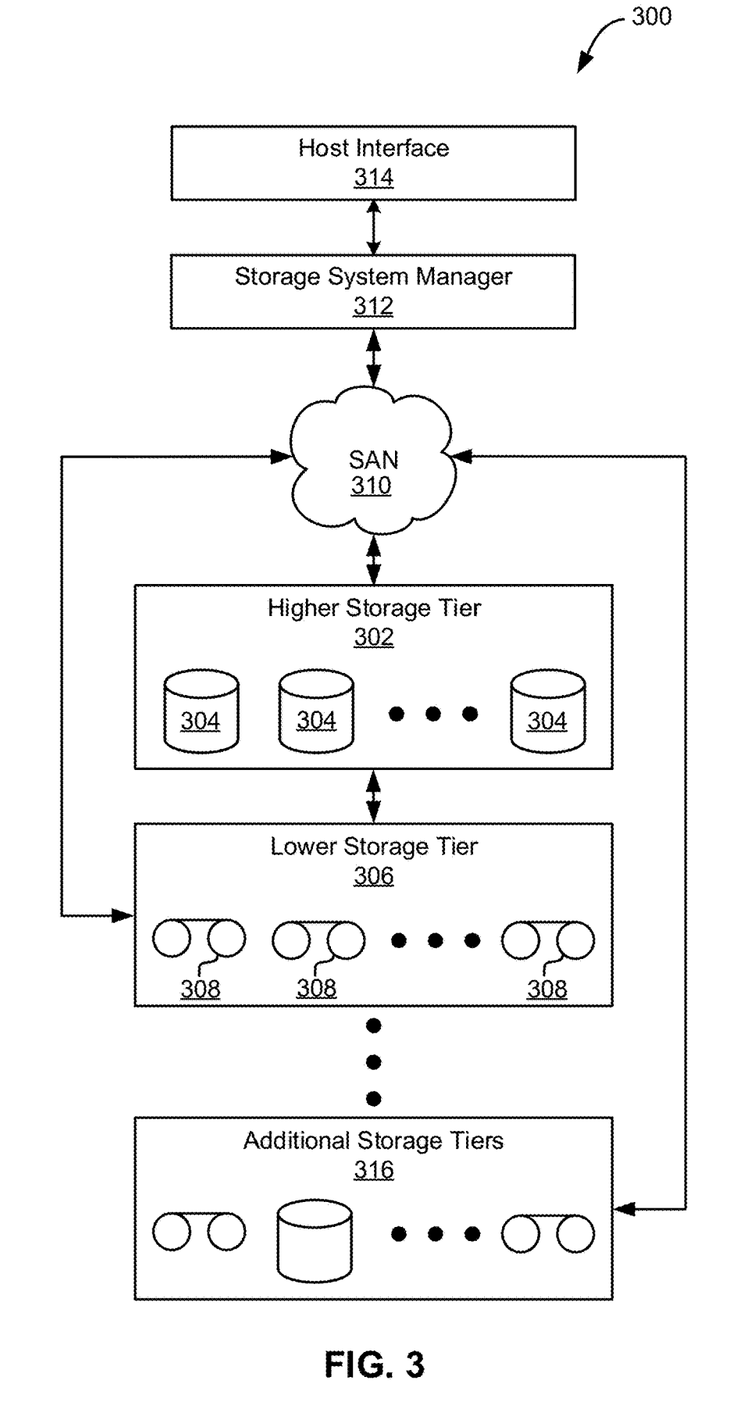
FIG. 3 illustrates a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Electrical components and electronic devices are often connected together with a variety of cables. Modern computer data centers, power grids, manufacturing facilities, offices, commercial buildings, residential buildings, vehicles, airplanes, etc. contain hundreds or thousands of cable connections, all of which appear similar or the same, and could be closely laid to each other or tangled, further complicating attempts to identify each cable in a group of such cables. Other "cables," as used herein, may be in the form of pipes which carry various fluids to different physical areas or any other elongated material which extends in a first direction and a second direction and runs parallel to other "cables" which would gain the advantages of the presently disclosed invention. Finding the ends of individual cables and/or identifying where an individual cable is connected may be extremely difficult in situations where a large number of cables converge and many or all of the cables appear similar or exactly the same.

Augmented reality (AR) augments a native view of reality using digital information and virtual objects. AR enables human-computer interaction in real time. AR may be implemented on a variety of widely available smart devices including smart phones, mobile devices, head mounted displays, tablets, smart glasses, various other AR headsets, etc. There are two main types of AR technology: marker-based and markerless based. Markerless based AR technology allows the user to move virtual objects in physical space. Markerless AR technology does not require an "anchor" to the real world and virtual objects appear to float in physical space. Marker-based technology anchors the digital world to the real world by recognizing object markers in the native view. Virtual objects may be displayed only if its corresponding marker pattern is visible. For example, a unique identifier located at a lower left corner of a device may uniquely identify the device and information (e.g., management credentials of the device, manufacturing details of the device, digital help manuals, specifications, etc.) related to the specific device may be linked to the marking. The object markers may be a type of fiducial marker. Object markers may be any marking with adequate visual points for the AR system to detect.

Conventional approaches for identifying the ends of cables include manually tagging the ends of cables with markings. Conventional markings typically include stickers which are limited in color options, easily tear, wear off and/or break down over time, etc. Manual marking may also be error prone due to inconsistent marking, lack of marking, etc. Conventional markings are limited in the amount of information which may be communicated.

Various embodiments of the present invention use marker-based AR technology and uniquely identifying object markers to identify each end of any cable. At least some approaches include selecting a cable of interest and, using an AR user device and a uniquely identifying object marker for the cable at a first end of the cable, detecting the second end of the cable of interest.

Figure 4:
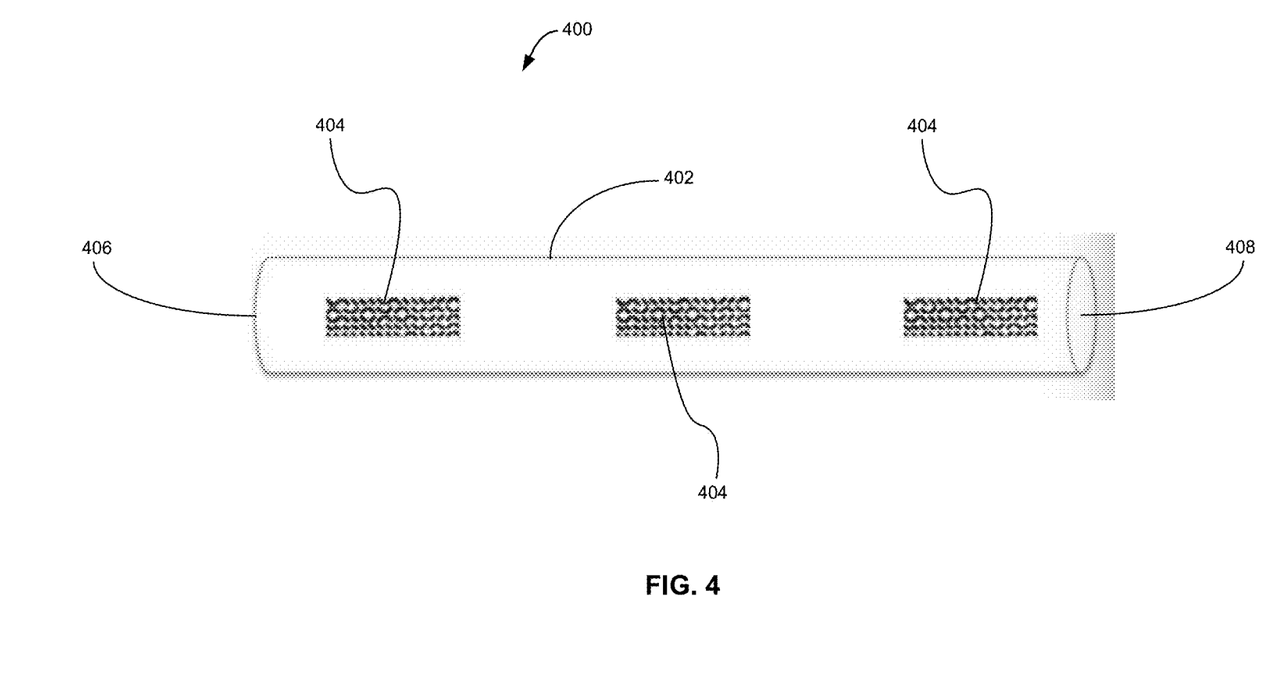
FIG. 4 depicts an exemplary apparatus, in accordance with one embodiment of the present invention.

FIG. 4 depicts an apparatus 400, in accordance with one embodiment. As an option, the present apparatus 400 may be implemented in conjunction with features from any other embodiment listed herein, such as those described with reference to the other FIGS. Of course, however, such apparatus 400 and others presented herein may be used in various applications and/or in permutations which may or may not be specifically described in the illustrative embodiments listed herein. Further, apparatus 400 presented herein may be used in any desired environment.

Apparatus 400 comprises a cable 402. The cable 402 may be any type of cable known in the art. The cable 402 may be used in any application known in the art including, but not limited to, cables for data centers, manufacturing facilities, offices, residential buildings, commercial buildings, vehicles, airplanes, etc. In various approaches, the cable 402 may be a pipe, cord, rope, wire, chain, or any other connecting material known in the art, or as otherwise described herein.

The apparatus 400 comprises at least two uniquely identifying object markers 404. The uniquely identifying object markers 404 may be unique to each cable 402 in a plurality of cables.

Figure 5:
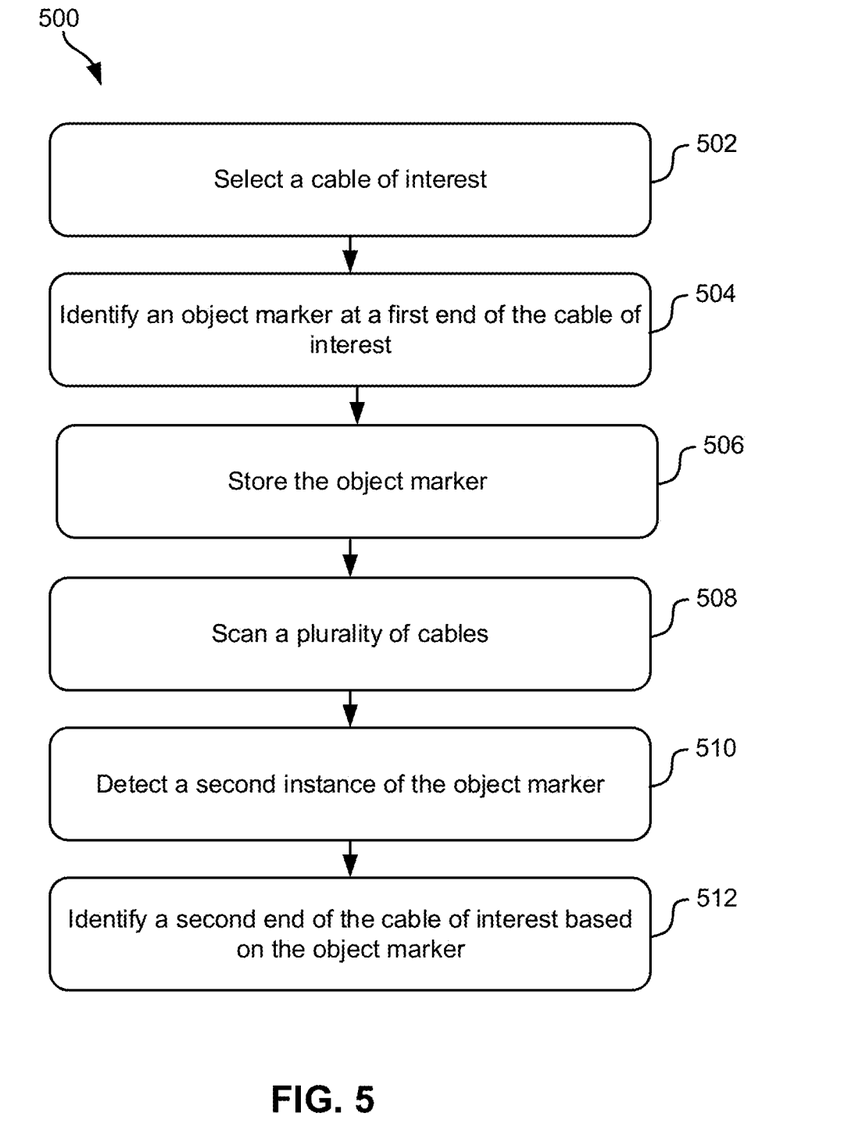
FIG. 5 is a flowchart of a method, in accordance with one embodiment of the present invention.

In various approaches, any known AR user device may be used in combination with the apparatus 400 and operations of the method 500 to be discussed in detail below. In a preferred approach, the AR user device comprises at least one camera component and a visual interface to a user, for the user to view the cable 402 (and, in various embodiments, one or more other cables in the visual field of one or more camera components of the AR user device, if such are in a proximity of the cable of interest) in an augmented reality environment. For example, AR technology may be implemented on a smart phone with a camera component. The camera component may be used to scan the apparatus 400 and an AR application implemented on the smart phone may identify the object markers 404 as would be understood by one having ordinary skill in the art upon reading the present disclosure.

In a preferred embodiment, the object marker 404 is configured to enable AR detection of each end of the cable 402 among a plurality of cables. The object marker 404 may be any marking usable with marker-based AR technology known in the art including Globally Unique Identifiers (GUID). GUIDs are universally unique identifiers comprising 128 bit values in hexadecimal format. An exemplary GUID may be given by 123e567-e89b-12d3-a456-42655440000. In another approach, the object markers 404 may be in hexadecimal format in the form 8-4-4-4-12 for a total of 36 characters (e.g., 32 alphanumeric characters and four hyphens). In this format, the object markers 404 may be identified using character recognition mechanisms known in the art. In some approaches, the object markers 404 may be human readable markers, machine readable markers, human and machine readable markers, etc., or any presently existing or after-arising equivalent.

The object marker 404 may be any two-dimensional (2D) graphical symbol and/or data code. In one approach, the object marker 404 is a DataGlyph® (Xerox Corporation, 201 Merritt 7, Norwalk, Conn., 06851-1056, USA). In preferred approaches, the object markers 404 are visually unobtrusive, flexible in shape, flexible in size, and adaptable for use on curved surfaces.

The uniquely identifying object markers 404 may be printed onto the cable 402, imprinted onto the cable 402, embedded into the cable 402, attached to the cable 402 or otherwise coupled to the cable 402 in any manner known in the art.

AR technology implemented in a user device may be capable of recognizing the object marker 404. The object marker 404 may be configured to trigger the display of virtual information in response to detection by the AR technology, as further described herein. The information may be any type of information including video, audio, visual, textual, graphical, etc. For example, any characteristic information may be displayed as a text box in an augmented reality environment displayed on a visual interface of an AR user device. A user may scan any object marker 404 in order to view characteristic information associated with the object marker 404 and/or the cable 402.

Information associated with an object marker 404 may be characteristic information of the cable including cable product information, information about the cable connection(s), the location of the cable, timestamp information about the cable and/or connection(s), the cable source device, the cable target device, port locations, etc. The characteristic information associated with the cable may be stored in any manner known in the art. In one approach, the characteristic information may be stored in a table, object (or series of objects), linked-list, or any equivalent computerized data structure functioning to store computerized data.

In a preferred embodiment, the characteristic information of the cable 402 includes the port location of the ends 406, 408 of the cable 402. The port location may be the source device of the cable, the immediate vicinity of the source device of the cable, the target device for the cable, the immediate vicinity of the target device for the cable, an estimated area for the connection derived from the physical and/or logical topologies for the cable, etc. A source device for the cable as referred to herein may correspond to a first end 406 of the cable 402. A target device for the cable as referred to herein may correspond to a second end 408 of the cable 402.

Characteristic information displayed in response to recognition of an object marker 404 may be gathered via any monitoring technique known in the art. The characteristic information may be manually entered by the user, the manufacturer, default settings, derived from logical topologies of a network associated with a cable, derived from physical topologies of a network associated with the cable, etc. In one approach, an exemplary monitoring technique for gathering information about the cable and/or connection(s) includes IBM Tivoli® Monitoring (International Business Machines Corporation, 1 New Orchard Road, Armonk, N.Y., 10504-1722, USA).

In one exemplary configuration, AR technology implemented on a smart phone may identify the object markers 404 in response to scanning the cable 402. In one embodiment, the object markers 404 may be highlighted for the user in the view of a visual interface on the smart phone. In another embodiment, the whole cable 402 may be highlighted in the view of the visual interface on the smart phone. In yet another embodiment, the object markers 404 and the cable 402 may both be highlighted for the user. The object markers 404 and/or the cable 402 may be highlighted in any manner known in the art. For example, the object markers 404 and/or the cable 402 may be shown in another color compared to other the object markers and/or the cables. In another example, the object markers 404 and/or the cable 402 may be outlined.

The cable 402 comprises at least two uniquely identifying object markers 404, one at each end of the cable 406 and 408. The cable 402 may include a plurality of uniquely identifying object markers 404 which may be evenly spaced along the cable.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502. Operation 502 includes selecting a cable of interest. A cable may be a pipe, cord, rope, wire, chain, or any other connecting material known in the art. AR technology may be implemented into a user device (e.g., via an application, software, etc.) for performing various operations of the method 500. In a preferred embodiment, the user device comprises at least one camera component and a visual interface to a user, for the user to view the cable (and, in various embodiments, one or more other cables in the visual field of one or more cameras of the AR device, if such are in a proximity of the cable of interest) in the augmented reality environment.

A user may select a cable of interest through an on-screen selection via the visual interface, through visual cues processed via known AR device mechanics, through movement cues processed via known AR device mechanics, etc. A cable of interest may be selected in any manner known in the art using AR technology, such as with a pointing device or a touchscreen available on the AR device. For example, a user may raise an AR-capable smart phone and aim a camera component at one or more cables. A user may view the one or more cables in an augmented reality environment and select a cable of interest by physically tapping the visual interface (e.g., the screen of the smart phone).

In various approaches, in response to selecting the cable of interest, an image of the cable of interest may be visually augmented (such as by, in an embodiment of the invention, the image captured by the camera component of the user device and displayed on the visual interface of the user device). Visually augmenting an image of the cable of interest may include highlighting the cable. The cable may be highlighted by changing the color of the cable, framing the cable, or any other highlighting technique known in the art. For example, in response to selecting the cable of interest, a user may view the cable of interest on an AR user device as highlighted in a yellow hue. Any unselected cables may remain unchanged in the user's view. In another example, a highlighted shape outlining the selected cable of interest may appear in the user's view of the AR user device.

Operation 504 includes identifying an object marker at a first end of the cable. Each object marker is uniquely identifying for each cable in a plurality of cables. The object marker is configured to enable AR detection of each end of the cable among a plurality of cables. The object marker may be any marking usable with marker-based AR technology known in the art including Globally Unique Identifiers (GUID), other hexadecimal formats, other markings, or any presently-existing of after-arising equivalents which are detectable by character recognition mechanisms known in the art or any other AR technology. In some approaches, the object markers may be human readable markers, machine readable markers, human and machine readable markers, etc. In another approach, the object marker may be any two-dimensional (2D) graphical symbol and/or data code. For example, the object marker may be a DataGlyph®. In preferred approaches, the object markers are visually unobtrusive, flexible in shape, flexible in size, and adaptable for use on curved surfaces.

In a preferred approach, the uniquely identifying object markers are printed onto the cable, imprinted onto the cable, embedded into the cable or otherwise coupled to the cable in any manner known in the art.

AR technology implemented in a user device may be capable of recognizing the object marker. In various approaches, the object marker may be configured to trigger the display of virtual information on the AR device or elsewhere in response to identifying the object marker at the first end of the cable. The information may be any type of information including video, audio, visual, textual, graphical, etc. Information associated with an object marker may be characteristic information of the cable including cable product information, information about the cable connection (s), the location of the cable, timestamp information about the cable and/or connection(s), the cable source device, the cable target device, etc. In a preferred embodiment, the characteristic information of the cable includes the port location of the second end of the cable. The port location may be the target device for the cable, the immediate vicinity of the target device for the cable, an estimated area for the connection derived from the physical and/or logical topologies for the cable, etc. Scanning the plurality of cables includes detecting any object marker identified with any of the plurality of cables.

Characteristic information displayed in response to recognition of an object marker may be gathered via any monitoring technique known in the art. The characteristic information may be manually entered by the user, the manufacturer, default settings, derived from logical topologies of a network associated with the cable, derived from physical topologies of a network associated with the cable, derived from a network topology blueprint from which the network was built, etc. In one approach, an exemplary monitoring technique for gathering information about the cable and/or connection(s) includes IBM Tivoli® Monitoring.

Operation 506 includes storing the object marker. The object marker may be stored in association with the cable of interest in any manner known in the art. In a preferred approach, the object marker and/or the association with the cable of interest is stored in a table.

Operation 508 includes scanning a plurality of cables. A camera component of a user device may be directed at a plurality of cables by a user, by autonomous machinery, etc. In one embodiment, a user may move a user device in order to aim the camera component at the plurality of cables such that the plurality of cables is in view of the camera component. In an alternative embodiment, the camera may be in a stationary position substantially constantly directed at a plurality of cables. In one approach, the plurality of cables may be scanned at the port location for the cable of interest.

In another embodiment of the method, the scanning of a plurality of cables may be at a different location along the cable of interest and/or plurality of cables. The cable of interest may comprise a plurality of object markers which are evenly spaced along the cable of interest. In this approach, a second instance of the object marker at a different location along the cable of interest may be detected. A plurality of instances of the object marker may be sequentially detected at different locations along the cable of interest until a second end of the cable of interest is identified based on identifying the final instance of the object marker. In this alternative approach, detecting instances of the object marker along the cable of interest includes guiding a user to physically move between instances of the object marker. For example, the cable of interest and/or the object markers along the cable of interest may be visually augmented for directing a user to physically travel to the next instance of the object marker. In this example, a user may walk along the cable of interest while substantially constantly keeping the cable of interest in view of the camera component of the AR user device as the AR user device outputs guidance to the next instance of the object marker. The guidance may include any visual, audio, audiovisual, graphical, textual, etc., cues to the user (such as, for example, an arrow appearing on-screen, a vibration from the user device, and audio cue, etc.). For example, the user may see a notification on the visual interface of the AR user device stating, "The next object marker on this cable is 5 feet from your current location, please walk forward." In response to identifying a second end of the cable of interest based on the final instance of the object marker, characteristic information about the second end of the cable of interest may be output. The characteristic information about the second end of the cable of interest may be derived from the physical and/or logical topologies of a network associated with the cable of interest, manually entered by the user, the manufacturer, default settings, etc. Characteristic information displayed upon recognition of the second end of the cable of interest may be gathered via any monitoring technique known in the art.

Operation 510 includes detecting a second instance of the object marker. The detection of the second instance of the object marker may include matching the first instance of the object marker to a corresponding object marker out of the plurality of object markers associated with the plurality of cables other than the cable of interest. In a preferred embodiment, the second instance of the object marker appears substantially the same as the first instance of the object marker identified in operation 504.

Operation 512 includes identifying a second end of the cable based on the object marker. In various approaches, the second instance of the object marker is coupled to the second end of the cable of interest and the object marker uniquely identifies the cable of interest. Identifying a second end of the cable may include visually augmenting the image of the plurality of cables by highlighting the cable of interest in any manner known in the art.

In one embodiment, in response to identifying a second end of the cable based on the object marker, characteristic information about the second end of the cable may be output. The characteristic information about the second end of the cable may be derived from the physical and/or logical topologies of a network associated with the cable of interest, manually entered by the user, the manufacturer, default settings, etc. Characteristic information displayed in response to identification of the second end of the cable may be gathered via any monitoring technique known in the art.

In various approaches, detecting any instance of any object marker may trigger the output of characteristic information of the corresponding cable. The characteristic information may comprise any of the characteristic information listed above. For example, a user may identify any cable and/or retrieve characteristic information about the cable by scanning an object marker corresponding to the cable at any point along the cable.

Various embodiments presented herein may be used to quickly identify connections and to verify the accuracy of connections. Verifications may be performed without powering the connected devices. Verifications without power prevent failing devices caused by inaccurate connections.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus using augmented reality (AR) technology, the apparatus comprising:
   a display; and
   a processor and logic integrated with the processor, executable by the processor, or integrated with and executable by the processor, the logic being configured to:
   select a cable of interest;
   identify an object marker at a first end of the cable of interest, wherein the object marker is configured to trigger output of characteristic information of the cable of interest;
   in response to identifying the object marker at the first end of the cable of interest, output the characteristic information of the cable of interest, wherein the characteristic information of the cable of interest includes a port location of a second end of the cable of interest;
   store the object marker;
   scan a plurality of cables;
   iteratively detect at least two additional instances of the object marker at different locations along the cable of interest;
   identify second end of the cable of interest based on a final instance of the object marker; and
   output, to the display, a visual augmentation of the identified second end of the cable of interest.

2. The apparatus of claim 1, wherein the object markers are evenly spaced along the cable.

3. The apparatus of claim 1, wherein the characteristic information of the cable is selected from the group consisting of: cable product information, information associated with cable connection locations, and timestamp information associated with the cable connection locations.

4. A computer-implemented method using augmented reality (AR) technology, comprising:
   selecting a cable of interest;
   identifying an object marker at a first end of the cable of interest, wherein the object marker is configured to trigger output of characteristic information of the cable of interest;
   in response to identifying the object marker at the first end of the cable of interest, outputting the characteristic information of the cable of interest, wherein the characteristic information of the cable of interest includes a port location of a second end of the cable of interest;
   storing the object marker;
   scanning a plurality of cables;
   iteratively detecting at least two additional instances of the object marker at different locations along the cable of interest;
   identifying a second end of the cable of interest based on a final instance of the object marker; and
   outputting, to a display, a visual augmentation of the identified second end of the cable of interest.

5. The computer-implemented method of claim 4, comprising, in response to identifying the object marker at the first end of the cable of interest, outputting the characteristic information of the cable of interest.

6. The computer-implemented method of claim 5, wherein the characteristic information of the cable of interest includes a port location of the second end of the cable of interest.

7. The computer-implemented method of claim 4, wherein the characteristic information of the cable of interest is selected from the group consisting of: cable product information, information associated with cable connection locations, and timestamp information associated with the cable connection locations.

8. The computer-implemented method of claim 4, wherein detecting instances of the object marker along the cable of interest includes guiding a user to physically move between instances of the object marker.

9. The computer-implemented method of claim 8, wherein guiding the user to physically move between instances of the object marker includes audio and/or visual guidance along a length of the cable of interest.

10. The computer-implemented method of claim 4, wherein
   identifying the second end of the cable of interest based on the final instance of the object marker includes outputting characteristic information about the second end of the cable of interest.

11. The computer-implemented method of claim 4, wherein the visual augmentation of the cable of interest includes highlighting the cable of interest.

12. A computer program product for detecting ends of cables using augmented reality (AR) technology, the computer program product comprising a non-transitory computer readable storage medium having program instructions embodied therewith, the program instructions executable by a computer to cause the computer to:
   select, by the computer, a cable of interest;
   identify, by the computer, an object marker at a first end of the cable of interest, wherein the object marker is configured to trigger output of characteristic information of the cable of interest;
   in response to identifying the object marker at the first end of the cable of interest, output, by the computer, the characteristic information of the cable of interest, wherein the characteristic information of the cable of interest includes a port location of a second end of the cable of interest;

store, by the computer, the object marker;

scan, by the computer, a plurality of cables;

iteratively detect, by the computer, at least two additional instances of the object marker at different locations along the cable of interest;

identify, by the computer, the second end of the cable of interest based on a final instance of the object marker; and output, by the computer, on a display of the computer, a visual augmentation of the identified second end of the cable of interest.

13. The computer program product of claim 12, wherein detecting instances of the object marker along the cable of interest includes guiding a user to physically move between instances of the object marker.

14. The computer program product of claim 12, wherein identifying the second end of the cable of interest based on the final instance of the object marker includes outputting characteristic information about the second end of the cable of interest.

15. The computer program product of claim 12, comprising program instructions to visually augment, by the computer, an image of the cable of interest by highlighting the cable of interest.

16. The computer program product of claim 12, wherein the AR technology is implemented into a computer selected from the group consisting of: a mobile device and a head mounted display.

17. The computer program product of claim 12, wherein the characteristic information of the cable of interest includes additional information selected from the group consisting of: cable product information, information associated with cable connection locations, and timestamp information associated with the cable connection locations.

* * * * *